May 29, 1951 J. J. HOGLE 2,554,987
QUADRATURE SIGNAL REJECTOR
Filed July 1, 1948 2 Sheets-Sheet 1

Inventor:
John J. Hogle,
by Charles H. Mott
His Attorney.

May 29, 1951  J. J. HOGLE  2,554,987
QUADRATURE SIGNAL REJECTOR
Filed July 1, 1948  2 Sheets-Sheet 2
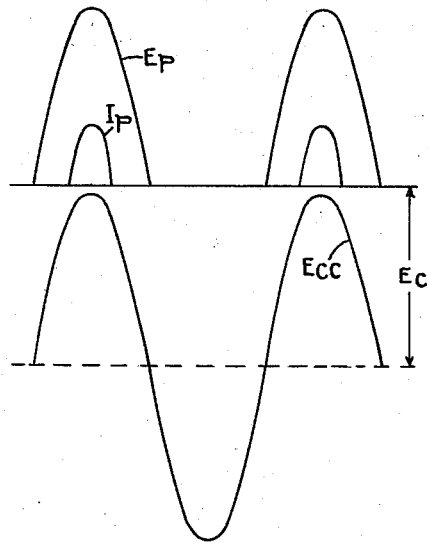
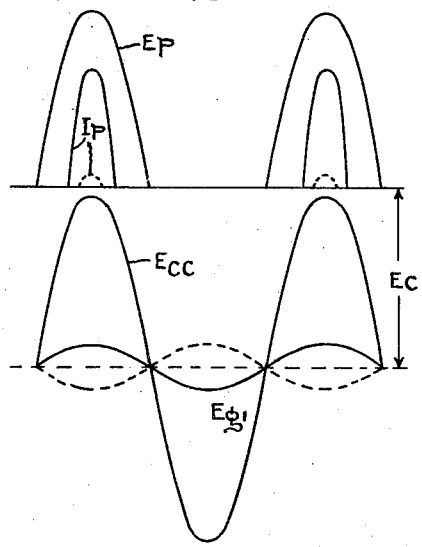
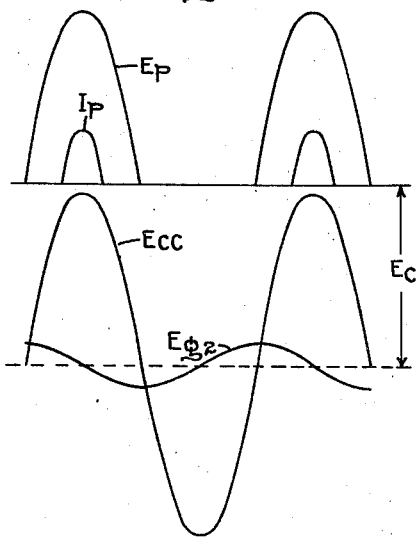
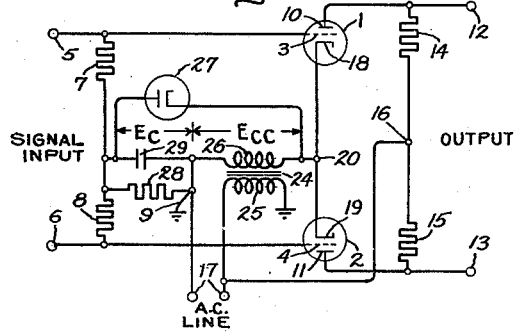
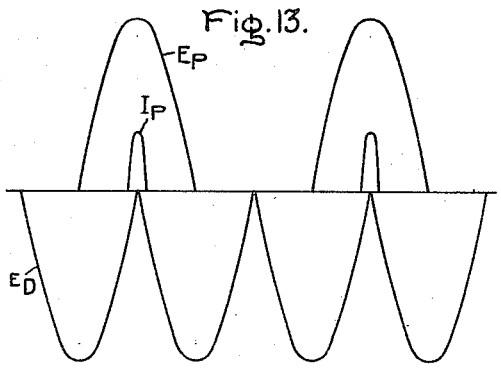
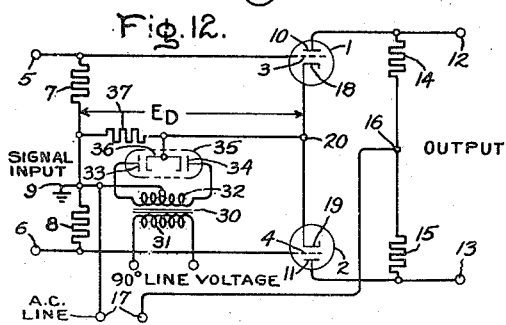
Inventor:
John J. Hogle,
by Claude S. Mott
His Attorney.

Patented May 29, 1951

2,554,987

UNITED STATES PATENT OFFICE 2,554,987

QUADRATURE SIGNAL REJECTOR

John J. Hogle, Rexford, N. Y., assignor to General Electric Company, a corporation of New York Application July 1, 1948, Serial No. 36,351

4 Claims. (Cl. 250—27)

This invention relates to discriminators and more particularly to means for discriminating against undesired out-of-phase signals in push-pull circuits.

A servo signal system ordinarily consists of Selsyns, A.-C. tachometers, transformers and potentiometers electrically connected in series. Ideally, the voltage outputs of these devices are in phase or 180° out of phase with each other and are therefore directly additive or subtractive. Usually, however, the outputs of some of these devices, Selsyns and tachometers principally, include quadrature or 90° out of phase voltages of troublesome magnitudes. These quadrature voltages have no fixed magnitude relations with the normal signals for they are the result of manufacturing errors and tolerances. To a certain extent, the signals may be "phased-out" by means of capacitors and resistors, but when this method proves inadequate, other remedies must be sought.

One remedy is to use better Selsyns and tachometers. But better Selsyns and tachometers usually mean bigger Selsyns and tachometers which lend themselves to more precise manufacture. This method is expensive and usually prohibitive in that the extra size and weight of the devices cannot be tolerated.

There are two principal reasons why quadrature signal voltage should be eliminated or minimized. First, it diminishes the sensitivity of the servo amplifier. Second, it changes the amplifier output from its balanced condition. If this unwanted signal remained constant, we could compensate for its effects by adding a stage of gain of the proper amount, and by adding a balancing potentiometer or the like. Unfortunately, the out-of-phase voltage is never constant. It varies in magnitude and polarity in a random manner and consequently affects the amplifier sensitivity and output balance in similar haphazard fashion.

It is an object of my invention to minimize the effects of the out-of-phase signal by suitable discrimination.

Another object of my invention is to improve the sensitivity and output balance of a servo amplifier.

The invention will be more fully understood by referring now to the accompanying drawings wherein corresponding elements of the various figures are designated by like reference characters.

Figs. 8, 9 and 10 are waveforms illustrating the operation of Fig. 7.

Fig. 11 is a modification of Fig. 7.

Fig. 12 is a still further modification of my invention.

Fig. 13 is a waveform explaining the operation of the circuit of Fig. 12.

Figure 1:
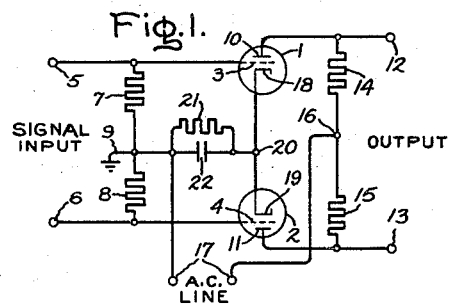
Fig. 1 is a schematic representation of a conventional discriminator circuit with push-pull output.

Referring now to Fig. 1, I have shown a push-pull circuit comprising valves 1 and 2 having input grids 3 and 4 connected to input terminals 5 and 6 across which is connected an input impedance which may consist of two input resistors 7 and 8 having a center tap connected to ground 9. Valves 1 and 2 have anodes 10 and 11, respectively connected to two output terminals 12 and 13 across which is connected an impedance which may consist of two output resistors 14 and 15 joined together at a center tap 16 connected to one terminal of a source of alternating voltage 17, the other terminal of which is connected to ground at 9. Valves 1 and 2 include cathodes 18 and 19 connected together at 20. Valves 1 and 2 are biased by connecting a resistor 21 between the cathodes 18, 19 and ground 9, which resistor is by-passed by a condenser 22.

The operation of Fig. 1 may best be explained by referring now to the waveforms illustrated in Figs. 2 through 5.

Figure 2:
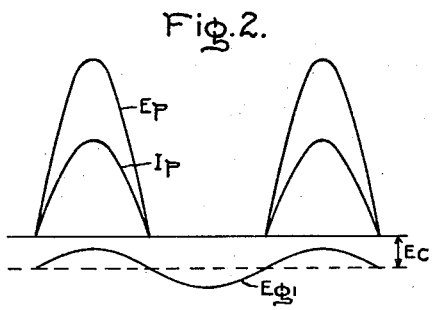
Figs. 2, 3, 4 and 5 are waveforms illustrating the operation of the circuit shown in Fig. 1.

Fig. 2 shows the operating characteristic of a single valve when the input signal is in phase with the alternating voltage of source 17. This condition is exemplified by the fact that the input voltage $E_{g1}$ is in phase with the waveforms of plate voltage and plate current respectively identified as $E_p$ and $I_p$. The voltage $E_c$ represents the bias and diagrammatically represents the level above which the input signal must rise in order for the valve to conduct and pass the current $I_p$.

Figure 3:
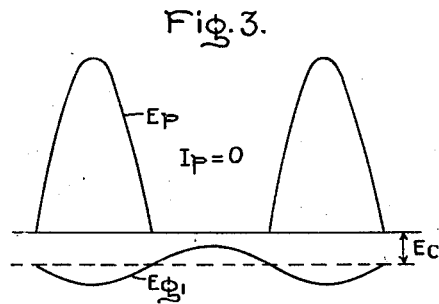

Fig. 3 is similar to Fig. 2 and illustrates how tube current cuts off when the input signal is of opposite polarity.

Figure 4:
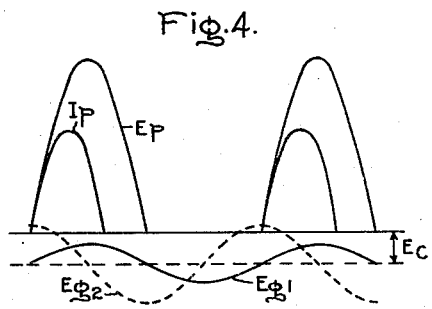

Fig. 4 illustrates the case where the input signal is now composed of in-phase and quadrature components $E_{g1}$ and $E_{g2}$ respectively. The out-of-phase component $E_{g2}$ is usually much larger than the pure in-phase component $E_{g1}$ required to saturate the valve. The addition of the in-phase and out-of-phase components produces a resultant which determines the magnitude and duration of plate current flow. Accordingly, it will be noted from Fig. 4 that the out-of-phase component $E_{g2}$ causes the plate current to flow for a shorter period of time.

Figure 5:
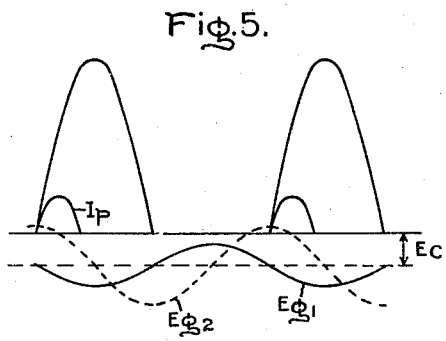

Fig. 5 shows how plate current still flows even when the in-phase component is sufficiently negative to cut the valve off when there is no quadrature signal.

Figure 6:
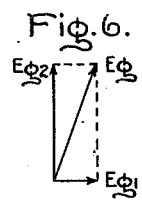
Fig. 6 is a vector diagram illustrating the combination of in-phase and quadrature signal components.

Fig. 6 gives an indication of how the sensitivity is affected by an out-of-phase signal. For example, when $E_{g2}$ is much larger than $E_{g1}$ comparatively large changes in $E_{g1}$ have but little effect in changing the resultant $E_g$.

From the above series of waveforms it will be readily appreciated that any random out-of-phase components haphazardly affect amplifier sensitivity and output balance.

Figure 7:
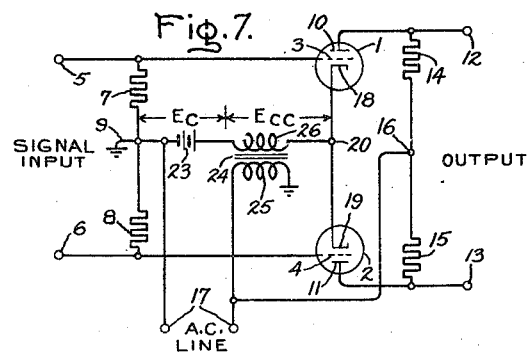
Fig. 7 is a schematic representation of my basic out-of-phase rejection circuit.

Referring now to Fig. 7, I have shown a circuit which substantially eliminates out-of-phase input signals. It will be noted that my circuit is similar to that of Fig. 1 altho it employs a novel biasing arrangement between the cathode junction point 20 and the center tap 9 of the input impedance. This arrangement comprises essentially a high, fixed D.-C. bias voltage serially connected with a high alternating bias voltage provided by a transformer 24 having a primary winding 25 and a secondary winding 26. The primary winding 25 is fed from the alternating voltage source 17. The voltage across the secondary winding 26 is the alternating bias voltage at 23 between the valve cathodes 18, 19 and ground 9. It is important that the magnitudes of the D.-C. and A.-C. bias voltages be several times greater than the maximum input voltage of the quadrature signal.

The operation of the circuit shown in Fig. 7 will be better understood from the following discussions of the waveforms illustrated in Figs. 8 through 10. Referring now to Fig. 8, there are shown, waveforms similar to those already discussed except that the bias voltages $E_c$ and $E_{cc}$ are now seen to be of much greater magnitude. $E_c$ is approximately of the same value as the peak value of $E_{cc}$, the difference between them determining the value of balance plate current. Voltage $E_c$ is so adjusted as to allow a certain amount of plate current to flow when there is no signal input. Thus, it will be seen that the fixed bias $E_c$ allows conduction only along a narrow band about the point where $E_{cc}$ is maximum. In other words, conduction occurs above the cut-off point of the valve.

Referring now to Fig. 9, the in-phase signal $E_{g1}$ will be seen to add directly to, (or substract from $E_{cc}$ depending upon instantaneous polarity), resulting in a proportional increase or decrease in $I_p$.

Fig. 10 shows the signal input to be 90° out of phase. At the point where $E_{cc}$ is maximum, $E_{g2}$ is minimum. The narrow band of conduction occurs about the point where the quadrature voltage has its minimum value. Thus $E_{g2}$ has very little effect upon the valve output. The larger $E_{cc}$ is compared to $E_{g2}$, the less important is the effect of the latter.

It will now be apparent from the waveforms relating to Fig. 7 that the out-of-phase signal input voltages are substantially ineffective and only negligibly affect the amplifier sensitivity and output balance. A disadvantage to be considered with the arrangement of Fig. 7 of course, is the lower average output which means a reduction in gain. But now since the gain will not vary appreciably with the out-of-phase fluctuations, it will be possilble to compensate for this loss, which in many cases is not serious. There are many applications of course, where the gain depends only on the variation of the output peak, as for example, when a capacitor is shunted across the output resistor to give a sawtooth wave output for firing a thyratron.

Referring now to Fig. 11, a still further modification is shown wherein the D.-C. bias voltage $E_c$ is supplied by a rectifier 27 and filter combination comprising resistor 28 across which is connected a capacitor 29. The voltage $E_{cc}$ across the secondary winding 26 supplies the A.-C. input to rectifier 27 thus making the biasing arrangement self-regulating since variations in the A.-C. bias will cause corresponding changes in the D.-C. portion. The filter time constant is sufficiently large so that $E_c$ is approximately the same as the peak value of $E_{cc}$. Resistor 28 is made large so that the loading on transformer winding 26 will be negligible and the rating of the transformer will depend practically only on the plate current of valves 1 and 2 which of course passes through winding 26 to ground. Otherwise Fig. 11 is similar to Fig. 7 and operates on the same principle.

Fig. 12 shows still another modification of my invention for effecting out-of-phase rejection of unwanted signals. A transformer 30 has a primary winding 31 supplied with a source of alternating voltage which is 90° out of phase with the alternating voltage 17. The secondary winding 32 has a mid-tap connected to ground. The end terminals of winding 32 are connected to the anodes 33 and 34 of a full wave rectifier 35, the cathodes 36 of which are connected to cathodes 18 and 19. A resistor 37 is connected between the above-mentioned cathodes and ground. Since transformer 30 supplies to the full wave rectifier 35, a voltage which is 90° out of phase with the line voltage, a pulsating D.-C. bias voltage will be produced across resistor 37.

The operation of this arrangement will be more readily appreciated by referring now to Fig. 13 which shows a waveform illustrating the effect of this type of biasing arrangement. It will be observed from Fig. 13 that the time of conduction of valves 1 and 2 is restricted to a small portion of the half wave about the point where the in-phase signals would be maximum and the out-of-phase signals would be minimum. This type of bias thus produces an effect similar to that of Fig. 11 except that a sharper discriminating action is produced because of the narrower conduction band. The average output is, of course, smaller.

While I have disclosed particular embodiments of my invention, it will of course be understood that any suitable source of alternating voltage may be employed. For example, it will be obvious that pulse voltages such as may be obtained from a pulsing transformer or a thyrite and resistor combination, may be particularly adaptable and should provide a suitable alternating bias $E_{cc}$. A pulse voltage, while narrower at the peak than a sine wave, can provide excellent discrimination, although the average output may be lower.

It will readily occur to those skilled in the art that other modifications may be made without departing from the teachings of my invention, and therefore it should be understood that the appended claims are intended to cover such modifications as lie within the true spirit and scope of my invention.

What I claim is:

1. A push-pull amplifier circuit for discriminating against undesired out-of-phase signals comprising, two triodes each having an anode, grid and cathode, input connections to said grids having a center tapped impedance thereacross, output connections from said anodes having a center tapped impedance thereacross, connections for connecting an alternating voltage supply between the center tapped impedances, a source of direct current bias voltage having a value several times greater in magnitude than that of the maximum undesired signal, a source of alternating voltage, the peak value of which is substantially of the same magnitude as the value of said direct current bias voltage, said sources being connected together and serially interposed between said input impedance and said cathodes.

2. A push-pull amplifier circuit for discriminating against undesired out-of-phase signals comprising, two triodes each having an anode, grid and cathode, input connections to said grids having a center tapped impedance thereacross, output connections from said anodes having a center tapped impedance thereacross, connections for connecting an alternating voltage supply between said center tapped impedances, a source of alternating bias voltage comprising a transformer having a primary winding connected to said supply and a secondary winding, said direct current source and said secondary winding serially interconnecting said input impedances with said cathodes.

3. A push-pull amplifier circuit for discriminating against undesired out-of-phase signals comprising, two triodes each having an anode, grid and cathode, input connections to said grids having a center tapped impedance thereacross, output connections from said anodes having a center tapped impedance thereacross, an alternating bias voltage source having one terminal connected to said cathode, a resistor connected between the other terminal of said source and the input impedance, a capacitor connected across said resistor, a rectifier connected between said input impedance and said cathodes, and connections for connecting a voltage supply between said other terminal of said source and the output impedance.

4. A push-pull amplifier circuit for discriminating against undesired out-of-phase signals comprising, two triodes each having an anode, grid and cathode, input connections to said grids having an impedance thereacross with a center tap, output connections from said anodes having an impedance thereacross with a center tap, connections for connecting an alternating voltage supply between said center taps, means for supplying a quadrature voltage, means for rectifying said quadrature voltage, and an output resistor across which said rectifier voltage may be applied, said resistor being connected between the input impedance and said cathodes.

JOHN J. HOGLE.

REFERENCES CITED

The following references are of record in the file of this patent:

UNITED STATES PATENTS

| Number | Name | Date |
|---|---|---|
| 2,432,669 | Kliever | Dec. 16, 1947 |